United States Patent
Syvokin

(10) Patent No.: US 11,294,153 B2
(45) Date of Patent: Apr. 5, 2022

(54) ILLUMINATION SYSTEM FOR LIGHT PROJECTION

(71) Applicant: RAYTHEON CANADA LTD., Midland (CA)

(72) Inventor: Viktor Syvokin, Midland (CA)

(73) Assignee: Raytheon Canada LTD., Midland (CA)

(*) Notice: Subject to any disclaimer, the term of this patent is extended or adjusted under 35 U.S.C. 154(b) by 34 days.

(21) Appl. No.: 16/761,229

(22) PCT Filed: Dec. 18, 2017

(86) PCT No.: PCT/CA2017/051531
§ 371 (c)(1),
(2) Date: May 1, 2020

(87) PCT Pub. No.: WO2019/119099
PCT Pub. Date: Jun. 27, 2019

(65) Prior Publication Data
US 2020/0355894 A1    Nov. 12, 2020

(51) Int. Cl.
*G02B 13/16* (2006.01)
*G03B 21/00* (2006.01)
*G03B 21/28* (2006.01)

(52) U.S. Cl.
CPC .......... *G02B 13/16* (2013.01); *G03B 21/008* (2013.01); *G03B 21/28* (2013.01)

(58) Field of Classification Search
CPC .............. G02B 13/16; G02B 26/0833; G02B 19/0028; G02B 19/0047; G03B 21/008; G03B 21/28; G03B 21/208; G03B 21/2066
See application file for complete search history.

(56) References Cited

U.S. PATENT DOCUMENTS

| | | | | |
|---|---|---|---|---|
| 5,387,999 A | * | 2/1995 | Hayashi | G02B 27/646 359/554 |
| 5,914,818 A | * | 6/1999 | Tejada | G02B 13/02 359/663 |
| 6,124,972 A | * | 9/2000 | Hayakawa | G02B 15/1461 359/557 |
| 7,033,032 B2 | | 4/2006 | Nakamura | |
| 8,585,210 B2 | | 11/2013 | Cheng et al. | |
| 9,785,043 B2 | * | 10/2017 | Matsuo | G03B 21/53 |

(Continued)

FOREIGN PATENT DOCUMENTS

CN 207424359 U * 5/2018 ............ G02B 13/00
JP 2004-045718 A 2/2004
(Continued)

OTHER PUBLICATIONS

Extended European search report from corresponding European Application No. 17935264.6, Extended European search report dated Mar. 16, 2021 (10 pgs.).

*Primary Examiner* — Michelle M Iacoletti
*Assistant Examiner* — Magda Cruz
(74) *Attorney, Agent, or Firm* — Lewis Roca Rothgerber Christie LLP

(57) ABSTRACT

A system for delivering light from a light source to a digital micro-mirror device. The system includes one or more lens groups. At least one lens of the system is laterally displaced, so that its optical axis is not centered on the chief ray of the system.

16 Claims, 7 Drawing Sheets

(56) References Cited

U.S. PATENT DOCUMENTS

2006/0139730 A1*  6/2006  Oehler ................. H04N 5/7458
                                                     359/291
2012/0212841 A1   8/2012  Wang et al.
2015/0338729 A1* 11/2015  Kawasumi ........... G03B 21/008
                                                     353/99

FOREIGN PATENT DOCUMENTS

| JP | 2004045718 A | * | 2/2004 | ............. G02B 26/08 |
| JP | 2005-018030 A | | 1/2005 | |
| WO | WO 2008068257 A1 | | 6/2008 | |

* cited by examiner

ILLUMINATION SYSTEM FOR LIGHT PROJECTION

CROSS-REFERENCE TO RELATED APPLICATION(S)

This application is a U.S. National Phase Patent Application and claims priority to and the benefit of International Application No. PCT/CA2017/051531, filed on Dec. 18, 2017, the entire content of which is incorporated herein by reference.

FIELD

One or more aspects of embodiments according to the present invention relate to illumination sources, and more particularly to an optical system for delivering light to a digital micro-mirror device.

BACKGROUND

A digital micro-mirror device (DMD) is a micro electrical-mechanical device composed of an array of tiny micro-mirrors that can be individually addressed electronically. A digital micro-mirror device may be used in a projection system (e.g., for projecting images or video). An illumination system in a projection system may employ a light source including a light pipe having a rectangular source region, in an output plane of the light pipe, at which the irradiance is substantially constant, and a light delivery system that may convey the light to the digital micro-mirror device, so that its surface is substantially uniformly illuminated. The aspect ratio of the rectangular source region may be the same as that of the digital micro-mirror device.

Because of the way the micro-mirrors are actuated, the digital micro-mirror device may be installed at an angle to a chief ray from the light source, and it may further be installed at a first surface of a prism, in which light travelling from the light source to the digital micro-mirror device is reflected, by total internal reflection, from a second surface of the prism, onto the digital micro-mirror device.

The effect of the angle between the digital micro-mirror device and the chief ray, as well as the wedge of the prism, may introduce asymmetries into the system that may result in a degradation of the performance of the optical system, producing, for example, (i) a distorted illumination patch that is not rectangular, and (ii) imperfect focus that may result in a loss of sharpness at the edges of the illumination patch. Such imperfections may result in a loss of optical efficiency. For example, in some related art systems, the light delivery system may be designed to generate an oversized illumination patch that overfills the digital micromirror device considerably more than required by just manufacturing and assembly tolerances, so that the uniformity of illumination over the digital micro-mirror device is acceptable in spite of the imperfect rectangularity of the illumination patch or blurring at its edges, the regions affected by these imperfections falling off of the edges of the digital micro-mirror device.

Thus, there is a need for an improved light delivery system for use in an illumination system for a digital micro-mirror device.

SUMMARY

Aspects of embodiments of the present disclosure are directed toward a system for delivering light from a light source to a digital micro-mirror device. The system includes one or more lens groups. At least one lens within a first lens group is laterally displaced, so that its optical axis is not centered on the chief ray of the system.

According to an embodiment of the present invention there is provided an optical system for receiving light from a source region of an output plane of a light source and producing spatially modulated light, the optical system having a chief ray and including: a first lens group, including a first plurality of lenses; and a second lens group, including one or more lenses, a first lens of the first lens group having: a rotationally symmetrical front surface; a rotationally symmetrical back surface; an effective focal length; and an optical axis defined by the rotationally symmetrical front surface and the rotationally symmetrical back surface, and the midpoint of the portion of the optical axis between the front surface and the back surface being offset from the chief ray by at least 5% of the effective focal length of the first lens.

In one embodiment, the optical system includes the first lens and a second lens, the first lens and the second lens being axially separated by less than 2 mm, and the second lens subgroup including a third lens and a fourth lens, the third lens and the fourth lens being axially separated by less than 2 mm.

In one embodiment, the first lens group has an effective focal length and the optical system includes a gap, between the first lens group and the second lens group, of at least 1.4 times the effective focal length of the first lens group.

In one embodiment, within the gap, rays originating from a midpoint of the source region: are parallel, or converge, with a convergence cone half-angle less than 10 degrees.

In one embodiment, the second lens subgroup includes the third lens and the fourth lens, each lens of the plurality of lenses of the second lens subgroup having: a rotationally symmetrical front surface; a rotationally symmetrical back surface; and an optical axis defined by the rotationally symmetrical front surface and the rotationally symmetrical back surface, each of the optical axes of the second lens subgroup being tilted, with respect to the chief ray, by at least 2 degrees.

In one embodiment, the optical axes of the lenses of the second lens subgroup are aligned to each other to within 0.2 degrees.

In one embodiment, a midpoint, of the portion of the optical axis, between the front surface and the back surface, of a lens of the plurality of lenses of the second lens subgroup, is offset from the chief ray by at most 1 mm.

In one embodiment, each of the respective optical axes of the plurality of lenses of the second lens subgroup is tilted, with respect to the chief ray, by at least 2 degrees.

In one embodiment, the optical system includes a prism having: a first planar surface; a second planar surface; and a third planar surface, the prism being composed of a transparent material having a first index of refraction the chief ray entering the prism through the first planar surface, and striking the second planar surface from the interior of the prism at a first angle relative to an internal normal vector of the second planar surface, the first angle being greater than the inverse sine of the reciprocal of the first index of refraction.

In one embodiment, the optical system includes a digital micro-mirror device at, and parallel to, the third planar surface of the prism, wherein the chief ray: reflects from the second planar surface, exits the prism through the third planar surface, reflects from the digital micro-mirror device, re-enters the prism through the third planar surface, and exits the prism through the second planar surface.

In one embodiment, the optical system includes the first lens and a second lens, the first lens and the second lens being axially separated by less than 2 mm, and the second lens subgroup including a third lens and a fourth lens, the third lens and the fourth lens being axially separated by less than 2 mm.

In one embodiment, the first lens group has an effective focal length and the optical system includes a gap, between the first lens group and the second lens group, of at least 1.4 times the effective focal length of the first lens group.

In one embodiment, within the gap, rays originating from a midpoint of the source region: are parallel, or converge, with a convergence cone half-angle less than 10 degrees.

In one embodiment, the second lens subgroup includes the third lens and the fourth lens, each lens of the plurality of lenses of the second lens subgroup having: a rotationally symmetrical front surface; a rotationally symmetrical back surface; and an optical axis defined by the rotationally symmetrical front surface and the rotationally symmetrical back surface, each of the optical axes of the second lens subgroup being tilted, with respect to the chief ray, by at least 2 degrees.

In one embodiment, the optical axes of the lenses of the second lens subgroup are aligned to each other to within 0.2 degrees.

In one embodiment, a midpoint, of the portion of the optical axis, between the front surface and the back surface, of a lens of the plurality of lenses of the second lens subgroup, is offset from the chief ray by at most 1 mm.

In one embodiment, each of the respective optical axes of the plurality of lenses of the second lens subgroup is tilted, with respect to the chief ray, by at least 2 degrees.

BRIEF DESCRIPTION OF THE DRAWINGS

Features, aspects, and embodiments are described in conjunction with the attached drawings, in which:

FIG. 2A is a side view of a system for producing spatially modulated light, according to an embodiment of the present invention;

FIG. 2B is a top view of a system for producing spatially modulated light, according to an embodiment of the present invention;

FIGS. 1-2B and 5 are drawn to scale, except for the light pipe 105 and the second prism 140 shown in one or more of these drawings.

DETAILED DESCRIPTION

The detailed description set forth below in connection with the appended drawings is intended as a description of exemplary embodiments of an illumination system for light projection provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
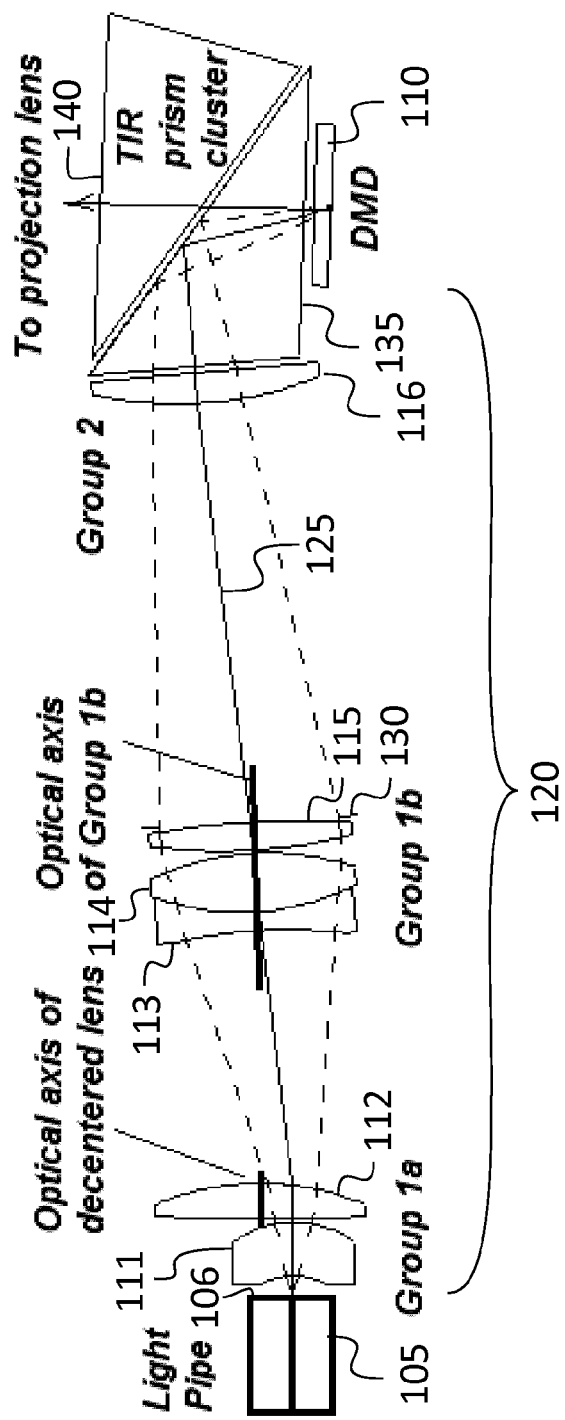
FIG. 1 is a side view of a system for producing spatially modulated light, according to an embodiment of the present invention.

FIG. 1 shows a system for generating spatially modulated light in one embodiment. A light source generates light having substantially constant irradiance over a rectangular source region of an output plane 106. A light delivery system 120 delivers the light to a digital micro-mirror device 110. The light reflected from each micro-mirror of the digital micro-mirror device is either delivered to the output of the system for generating spatially modulated light or dissipated (e.g., absorbed in a beam dump) depending on whether the micro-mirror is in the on state or the off state. Pulse width modulation of a drive voltage signal applied to the micro-mirror, at a frequency exceeding the ability of a viewer's eyes to respond, may be used to give the viewer a subjective impression of an intermediate brightness being displayed.

Each mirror, or pixel, is controllable to be in one of two states that may be referred to as "on" and "off" states. When the DMD is not energized there exists also a third "neutral" state when the surface of the micro-mirror may be aligned with the plane of the digital micro-mirror device (so that if all of the pixels are in the neutral position, the composite surface of the digital micro-mirror device, which includes an array of mirrors, is a substantially planar surface). In the on state, the micro-mirror is rotated from the neutral position through an angle A (with the angle A being 12 degrees, for example), and in the off state, the micro-mirror is rotated from the neutral position, in the opposite direction, through the angle A, so that in transitioning from the on state to the off state, the mirror rotates through an angle 2A. Light directed at the digital micro-mirror device surface and reflected by a pixel in the on state enters the pupil of a projection lens and reaches a screen. Light reflected by an off-state pixel is directed to an absorbing beam dump. The numerical aperture (NA) of the projection optics is defined by the pixel tilt angle as NA=sin(A) and, if A=12 degrees, the corresponding F-number is then f/=0.5/NA=2.41. To improve image contrast, the illumination optics may be designed to have slightly higher F-number, for example f/=2.45.

For high flux efficiency, the digital micro-mirror device may be uniformly illuminated by light that has numerical aperture equal to that of the projection optics. In practice, to improve image contrast at the expense of flux efficiency, the illumination optics may have a numerical aperture slightly less than that of projection optics. Also, to achieve high screen image uniformity (more than 80-85%), the system may be configured so that the illumination light is telecentric. "Telecentricity", as used herein, refers to the degree to which the respective chief (central) rays of the converging light cones hitting different micro-mirrors are parallel to each other.

In some embodiments, the light source has an output plane over a rectangular region of which the irradiance is substantially constant, i.e., the light source produces a substantially spatially uniform illumination within the rectangular region. The light source may include a non-uniform source, referred to herein as a "lamp", which may produce illumination that is not substantially uniform. For example, the lamp may be an arc lamp, or it may consist of one or more light emitting diodes. In this case the light source may further include an integrating device such as a light pipe, which may also be referred to as an integrator rod. The light pipe may be an element with a rectangular cross-section, and it may be either solid or hollow with a highly reflective coating on the interior surface. The ends of a light pipe may have different sizes; the output end may have the same aspect ratio as the digital micro-mirror device active area so that the output end of the light pipe may be conveniently re-imaged (with proper margin) onto the digital micro-mirror device using a relay lens, or "light delivery system".

FIG. 1 shows one view (arbitrarily referred to herein as a side view) of an illumination system, in one embodiment, for a 0.7 inch digital micro-mirror device 110 with 1024× 768 active micro-mirrors (i.e., an "Extended Graphics Array" (XGA) device), a 13.68 micron mirror (pixel) size and a micro-mirror tilt angle A of 12 degrees. The digital micro-mirror device may be, for example, a DLP7000 Type-A digital micro-mirror device available from Texas Instruments (www.ti.com). In the embodiment of FIG. 1 the output of a light pipe 105 is delivered to the digital micro-mirror device 110 by the light delivery system 120. The rectangular illuminated region (or "source region") of the output plane of the light pipe has dimensions of 7.84 mm×5.88 mm. The magnification of the light delivery system is M=1.787, which converts the 14.008 mm×10.506 mm digital micro-mirror device active area to the 7.84 mm×5.88 mm opening of the light pipe output. The design wavelengths are 643.8 nanometers, 546.1 nanometers, and 480.0 nanometers with equal relative weightings. The f-number at the digital micro-mirror device side is set to f/2.45.

The light delivery system 120 of FIG. 1 includes 6 lenses 111, 112, 113, 114, 115, 116. Light may travel from the light source through each of the lenses in turn, entering each lens through one surface (referred to herein as the "front" surface) and exiting through another surface (referred to herein as the "back" surface). Each of the lenses may have a shared axis of symmetry of the front surface and the back surface of the lens, which is referred to herein as the "optical axis" of the lens. For example, for a lens for which both the front surface and the back surface are spherical, the optical axis is a straight line passing through the centers of both spheres; for a lens for which one of the front surface and the back surface is spherical, and the other is planar, the optical axis is a straight line passing through the center of the sphere and perpendicular to the plane. For a lens which has an aspheric, rotationally symmetric front surface, the lens has an optical axis only if (i) the back surface is planar and the axis of symmetry of the front surface is perpendicular to the plane, (ii) the back surface is spherical and the axis of symmetry of the front surface passes through the center of the sphere, or (iii) the back surface is aspheric and rotationally symmetric and the axis of symmetry of the front surface is the same as the axis of symmetry of the back surface. As used herein, an "optical axis" is defined as explained above, and without regard to the edge or edges of the lens.

As is apparent in FIG. 1, one or more of the lenses of the light delivery system 120 may be offset or misaligned from one or more of the other lenses of the light delivery system 120. These offsets and misalignments may be defined with respect to a "chief ray" 125, which is defined herein to refer to the ray that extends from the center of the rectangular source region of the output plane of the light source, through the center of a aperture stop 130, and to the center of the digital micro-mirror device 110. For example, in the embodiment of FIG. 1, the second lens 112 is offset from the chief ray 125, and a lens subgroup formed by the third lens 113, the fourth lens 114, and the fifth lens 115 is misaligned with respect to the chief ray 125.

FIG. 2A shows the same view of the embodiment of FIG. 1 as does FIG. 1, with a larger number of optical rays drawn, and with coordinate axes shown. FIG. 2B shows a top view of the same embodiment. The optical prescription for the embodiment of FIGS. 1, 2A, and 2B is shown in Table 1, in units of millimeters and degrees. The axes of the system are as illustrated in FIGS. 2A and 2B. The decenter dY represents a shift of a surface along the Y axis (all surfaces are centered with respect to the X axis) and rotations are about the axis shown (e.g., X tilt is a rotation about the X axis, and Z tilt is a rotation about the Z axis). The digital micro-mirror device 110 is clocked (i.e., rotated about the Z axis) by 45 degrees because the axis of rotation of each micro-mirror is angled by 45 degrees with respect to the edges of the rectangular active area of the digital micro-mirror device, and the rectangular source region of the output plane of the light source is also clocked by 45 degrees so that the light from it is aligned with the active area of the digital micro-mirror device when it is delivered, by the light delivery system 120, to the digital micro-mirror device.

In the notation convention of Table 1 (and of Table 2, discussed below), the coordinate system used for each surface has an origin offset along the Z-axis of the coordinate system of the preceding surface by the thickness of the preceding surface, and offset along the X-axis or Y-axis of the coordinate system of the preceding surface, by any offsets of the preceding surface along these axes. The coordinate system used for each surface is also rotated relative to the coordinate system of the preceding surface by any tilts of the preceding surface. As such, the changes in coordinate system have cumulative effect. Notations of the changes in coordinate systems (which may be referred to as "coordinate system breaks" or "coordinate changes") are given according to the CodeV optical design program available from Synopsys (https://www.synopsys.com/optical-solutions/codev.html). A decenter type of "Basic" means that any offsets are applied to the surface before any tilts are applied. "Decenter & Bend" is a type of coordinate break used in CodeV. For reflective surfaces (mirrors) it sets the coordinate system to follow the reflected chief ray. For example, surfaces S14 to S16 in Table 1 (and 2) define a prism with angles between its pairs of adjacent surfaces equal to 50 degrees, 33.2 degrees, and 96.8 degrees, respectively.

TABLE 1

| Surface | Y radius of curvature | Thickness | Glass code | Semi-dia | Decenter Data dY | X-tilt deg | Z-tilt deg | Type |
|---|---|---|---|---|---|---|---|---|
| 0 - Object | INF | 0 | | | | | | |
| 1 | INF | 2.691 | | 4.9 | | | 45 | Basic |
| 2 - L1 | −11.268 | 8.649 | 893.204 | 5.5 | | | | |
| 3 | −16.417 | 0.5 | | 9 | | | | |
| 4 - L2 | 389.208 | 5.774 | 852.408 | 15.5 | 5.409 | | | Basic |
| 5 | −43.634 | 40.631 | | 15.75 | | | | |
| 6 - L3 | −85.119 | 3.0 | 847.238 | 14.2 | 0.552 | 3.412 | | Basic |
| 7 - L4 | 40.224 | 9.5 | 743.493 | 14.8 | | | | |
| 8 | −44.708 | 0.5 | | 15.35 | | | | |
| 9 - L5 | 87.582 | 4.445 | 852.408 | 15.15 | | | | |
| 10 | −169.427 | 0.1 | | 15 | | | | |
| 11 - Stop | INF | 68.203 | | 14.6 | | | | |
| 12 - L6 | 60.763 | 5.006 | 852.408 | 17.1 | 2.733 | 1.279 | | Basic |
| 13 | INF | 1.0 | | 17 | | | | |
| 14 Prism-in | INF | 21.737 | 517.642 | 21 | | | | |
| 15 Prism-diagonal | INF (TIR reflect) | −18.622 | 517.642 | 26.5 | | 50.0 | | Decenter & Bend |
| 16 Prism-out | INF | −1.5 | | 23 | | −16.8 | | Basic |
| 17 Window | INF | −2.6 | 487.704 | 15 | 0.475 | | −45 | Basic |
| 18 | INF | −0.7 | | 15 | | | | |
| 19 - Image | INF | 0 | | | | | | |

The lenses of the light delivery system 120 may be grouped into two groups, referred to herein as lens group 1 and lens group 2, and lens group 1 may be further grouped into two subgroups, referred to herein as lens subgroup 1a and lens subgroup 1b, as illustrated in FIG. 1. Each lens group and each lens subgroup may consist of one or more lenses. Gaps, or "air gaps" may be present between lens subgroup 1a and lens subgroup 1b, and between lens group 1b and lens group 2. These gaps may be employed to insert fold mirrors into the light delivery system 120, to achieve a more compact arrangement of the illumination optics.

Figure 2:
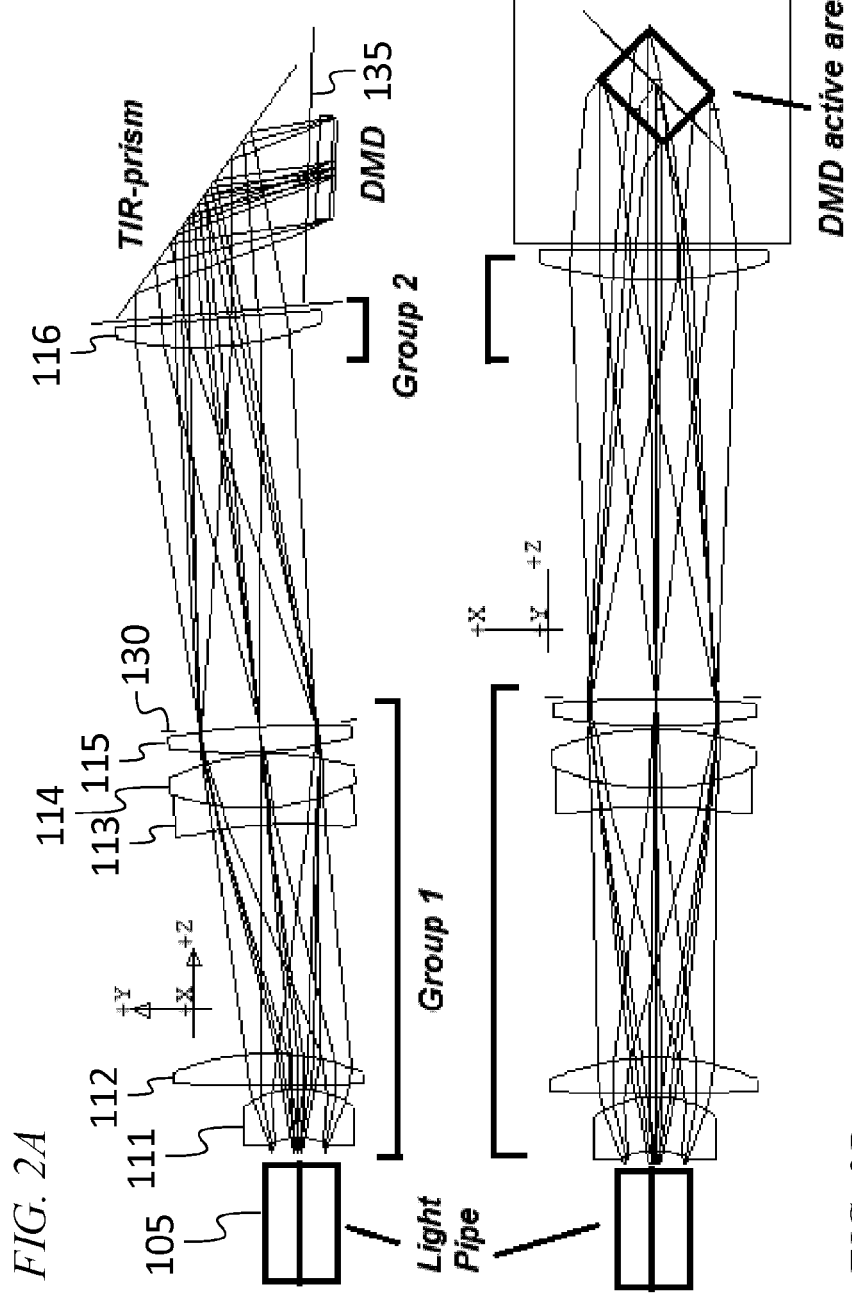

At least one of the lenses of lens group 1 may be decentered (e.g., the second lens 112, as illustrated in FIGS. 1 and 2a). In the embodiment of FIGS. 1-2B, the second lens 112 causes the chief ray to bend by certain angle. The lenses in lens subgroup 1b may also be decentered and tilted relative to the incoming chief ray direction. In some embodiments, all lenses in lens subgroup 1b are aligned to each other but the entire lens group is tilted by a small angle (about 2-5 degrees). The lenses in lens subgroup 1b may be aligned to each other to an extent readily achievably be a suitable manufacturing process, e.g., the optical axes (or the respective optical axes) may be (i) parallel to within 3-10 arc minutes, e.g., to within 5 arcminutes, and (ii) collinear to within 0.1-0.5 mm, e.g., to within 0.2 mm. This may be a relatively low cost design, and in such an embodiment, the lenses in lens subgroup 1b help to correct image aberrations but have little effect on the chief ray direction. The lens or lenses in lens group 2 may also be tilted and decentered slightly relative to the chief ray direction, to further correct aberrations. In some embodiments, instead of the second lens 112, the first lens 111 is offset, or both lenses of lens subgroup 1a (in a system in which lens subgroup 1a consists of two lenses) are offset, or lens subgroup 1a consists of only one lens, which is offset.

Lens group 1 and lens group 2 may perform qualitatively different functions. For example, lens group 1 may be a group of lenses that are closest to the light pipe 105, and lens group 1 may have the effect that after passing through lens group 1, light becomes either collimated or converging toward lens group 2. Lens group 1 may also be separated from lens group 2 by an air space the thickness of which (i.e., the length of which, along the chief ray) is larger than the effective focal length (EFL) of lens group 1. In the embodiment of FIGS. 1-2B the effective focal length EFL of lens group 1 is 37.4 mm and the air gap between lens group 1 and lens group 2 is 67-68 mm. After passing through lens group 2, light enters the total internal reflection prism cluster which includes a first prism 135 and a second prism 140. In particular, the converging cone of light enters the first prism 135 through a first surface of the first prism 135, experiences total internal reflection at a second (diagonal) surface of the first prism 135, and exits the first prism 135 through a third surface of the first prism 135, to hit the digital micro-mirror device 110 at an angle range that is 2A to (2A+2 degrees) degrees from the normal of the digital micro-mirror device 110. Here A is the tilt angle of the micro-mirror and for A=12 degrees the angle range is 24 degrees-26 degrees. If a micro-mirror of the digital micro-mirror device 110 pixel is in the on state then after reflection from the micro-mirror the rays are directed through the second prism 140, toward the projection optics (not shown) and finally reach the screen (not shown). The material and angles of the first prism 110 may be chosen in such a way that the cone of light reflected from the micro-mirrors in the on state hits the diagonal surface of the first prism 110 at angles less than the critical angle for total internal reflection, and thus does not reflect but passes through to the second prism 140 and further to the projection lens.

Figure 3:
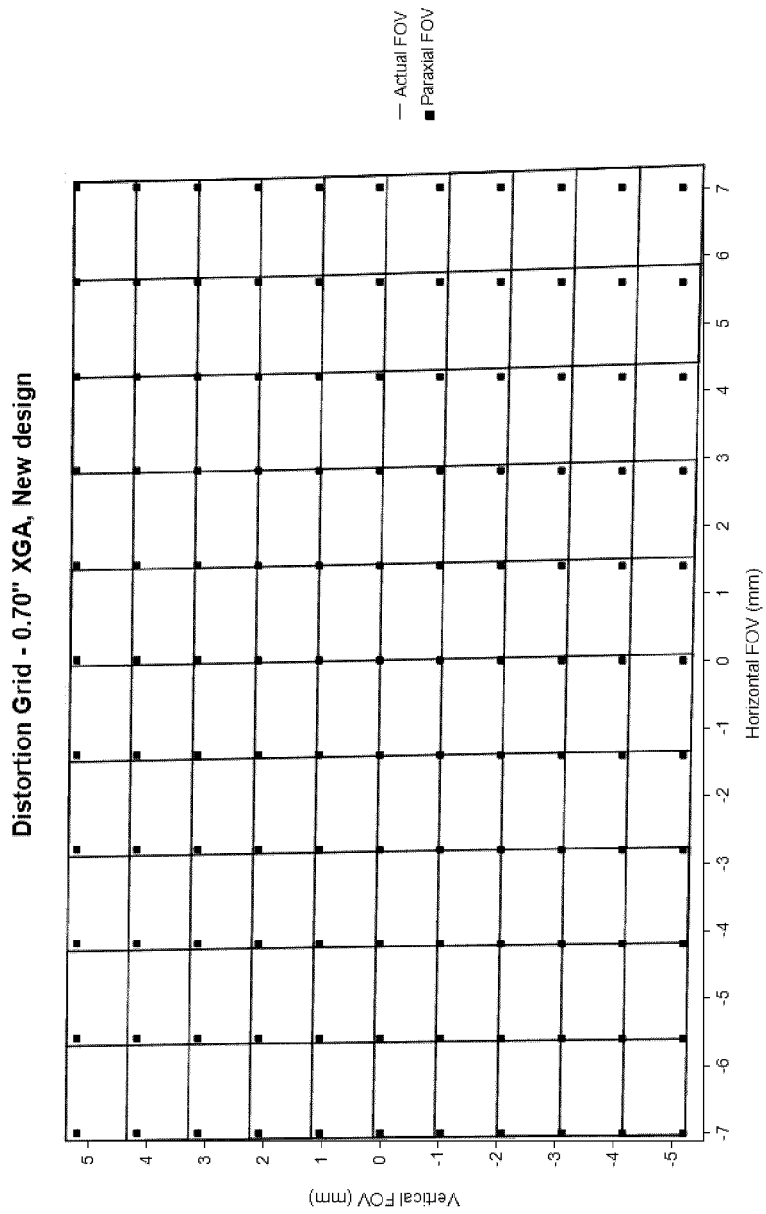
FIG. 3 is a simulated distortion grid for the embodiment of FIGS. 1-2B.

FIG. 3 shows a simulated distortion grid for the embodiment of FIGS. 1-2B. As may be seen from FIG. 3, distortion is reasonably well controlled in three of the four corners of the digital micro-mirror device 110. Specifically, distortion values are: 1.96% in the left-top corner, 0.46% in the right-top corner, 0.40% in the left-bottom corner and 5.1% in the right-bottom corner. The grid of points labeled "Paraxial FOV" in FIG. 3 shows the beam footprint in the case of ideal illumination optics and corresponds to the outline of the digital micro-mirror device active area. Minimizing image distortion may be beneficial in that it may allow the illumination system to have smaller overfill margin at the digital micro-mirror device 110, and thus have higher light utilization efficiency than a system with larger distortion.

Figure 4:
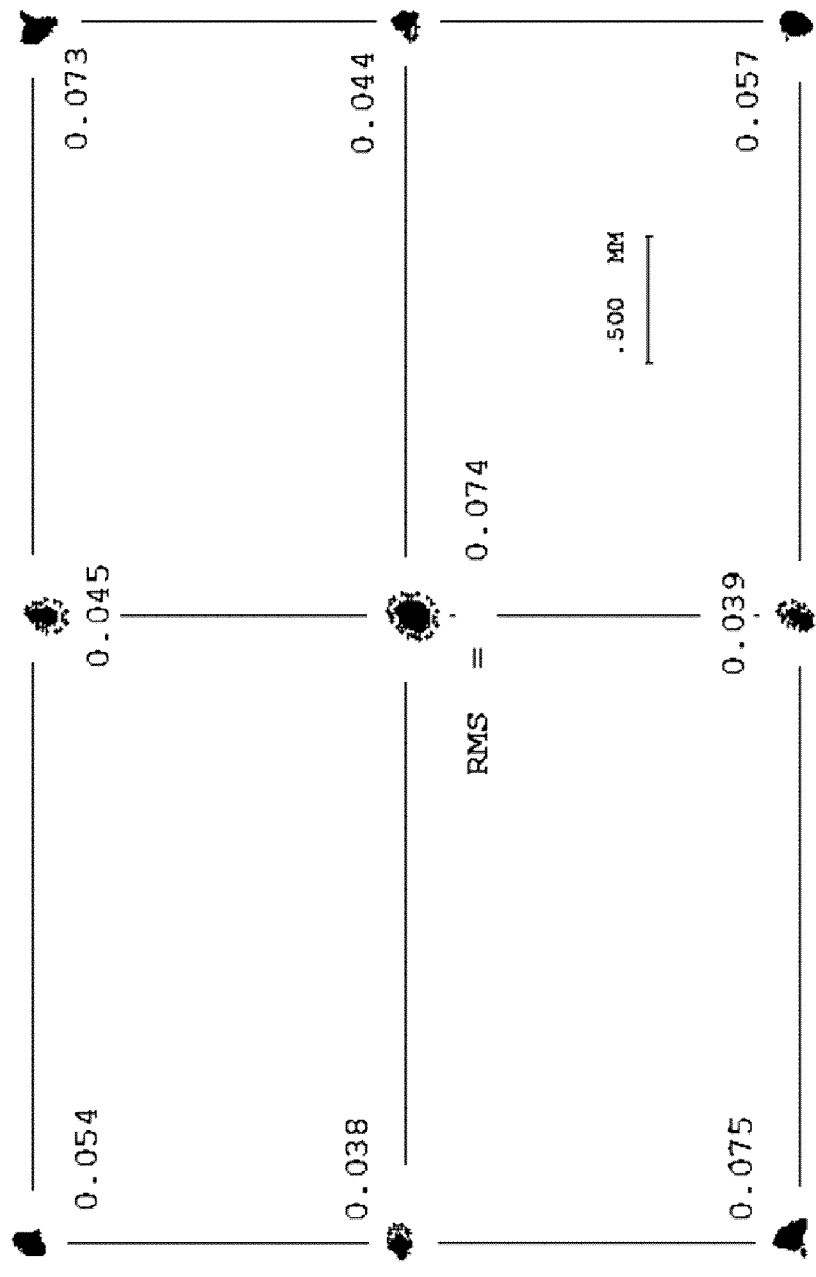
FIG. 4 is a simulated spot size diagram for the embodiment of FIGS. 1-2B.

Light utilization efficiency also depends on how tightly the light from the light source is focused on the digital micro-mirror device 110. Systems with tighter focus have sharper edge transitions and may therefore have smaller overfill margin. The root mean square (RMS) spot size is a metric that may be used to estimate the quality of lens focus, with a smaller root mean square (RMS) spot size generally resulting in higher light utilization efficiency. FIG. 4 shows root mean square spot sizes (in mm) at nine points on the digital micro-mirror device plane, the nine points being the center, four corners and four side-centers. FIG. 4 includes a scale bar (on which "MM" identifies millimeters as the unit of measure) for the spots (their separations are not drawn to scale). These root mean square spot size values are close to each other and quite small, showing that light is reasonably well focused over the entire digital micro-mirror device area.

Moreover, the degree of telecentricity in the embodiment of FIGS. 1-2B is relatively high: a simulation of this embodiment shows that the chief rays of the converging light cones hitting different micro-mirrors of the digital micro-mirror device are parallel to each other (telecentric) to within +/−0.15 degrees.

Figure 5:
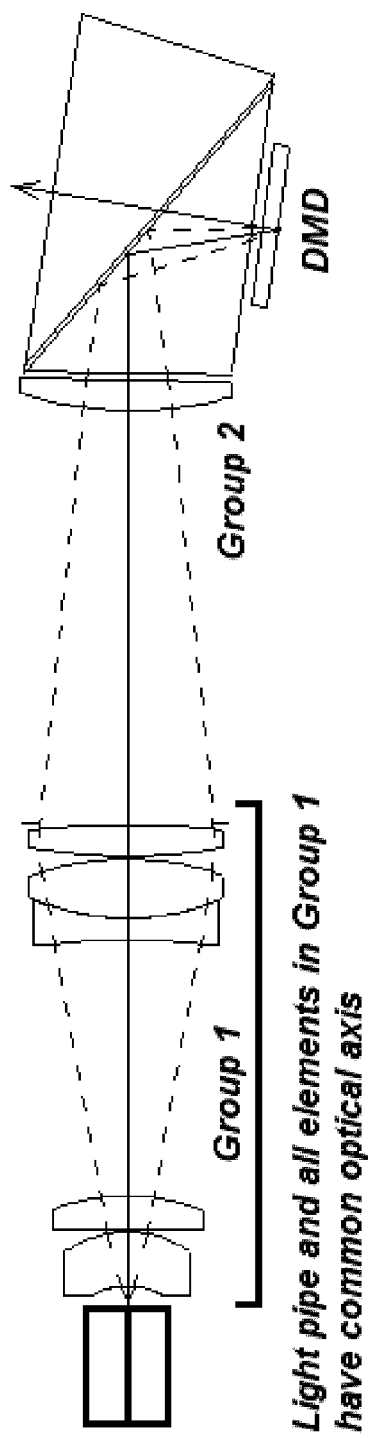
FIG. 5 is an illustration of a reference design, according to an embodiment of the present invention.

A similar design in which the lenses of lens group 1 were neither decentered nor tilted was also analyzed, to assess the extent to which the decentering of the second lens 112 and the tilting of lens subgroup 2 in the embodiment of FIGS. 1-2B contributed to the performance of that embodiment. This reference design is illustrated in FIG. 5, and the optical prescription for the reference design is presented in Table 2.

Figure 6:
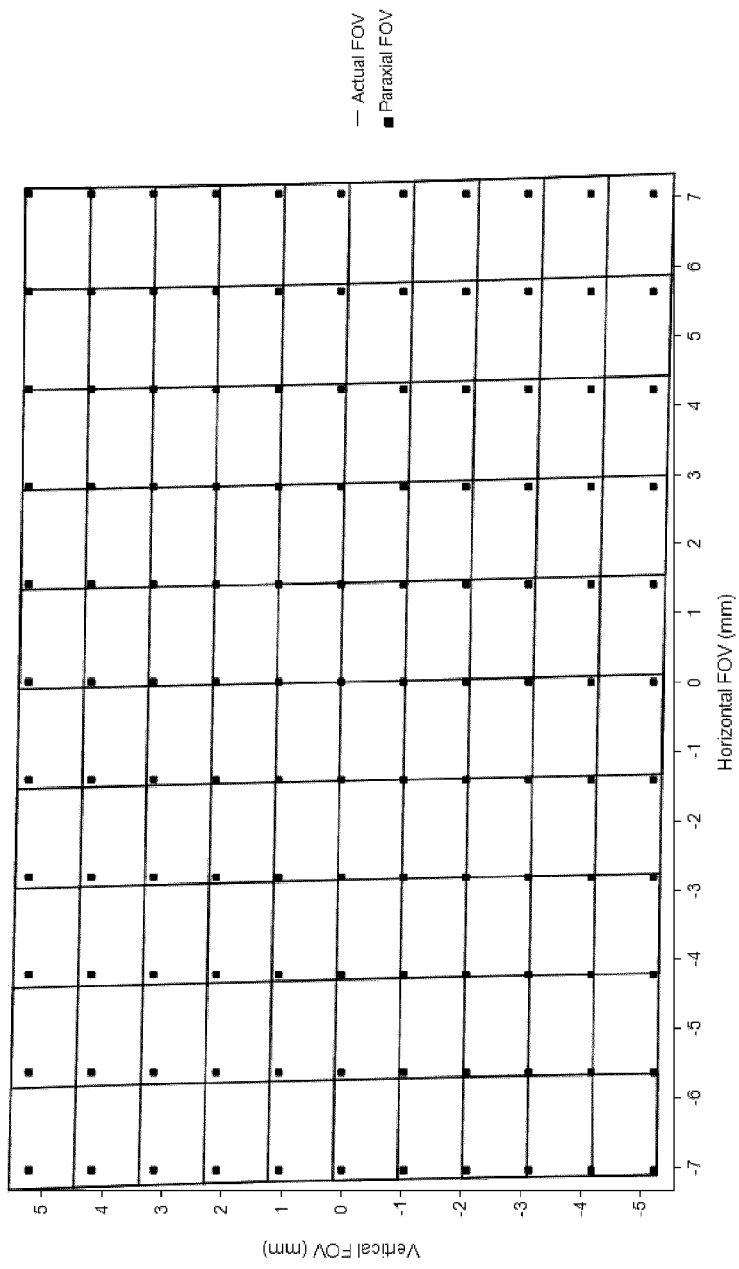
FIG. 6 is a simulated distortion grid for the reference design.
Figure 7:
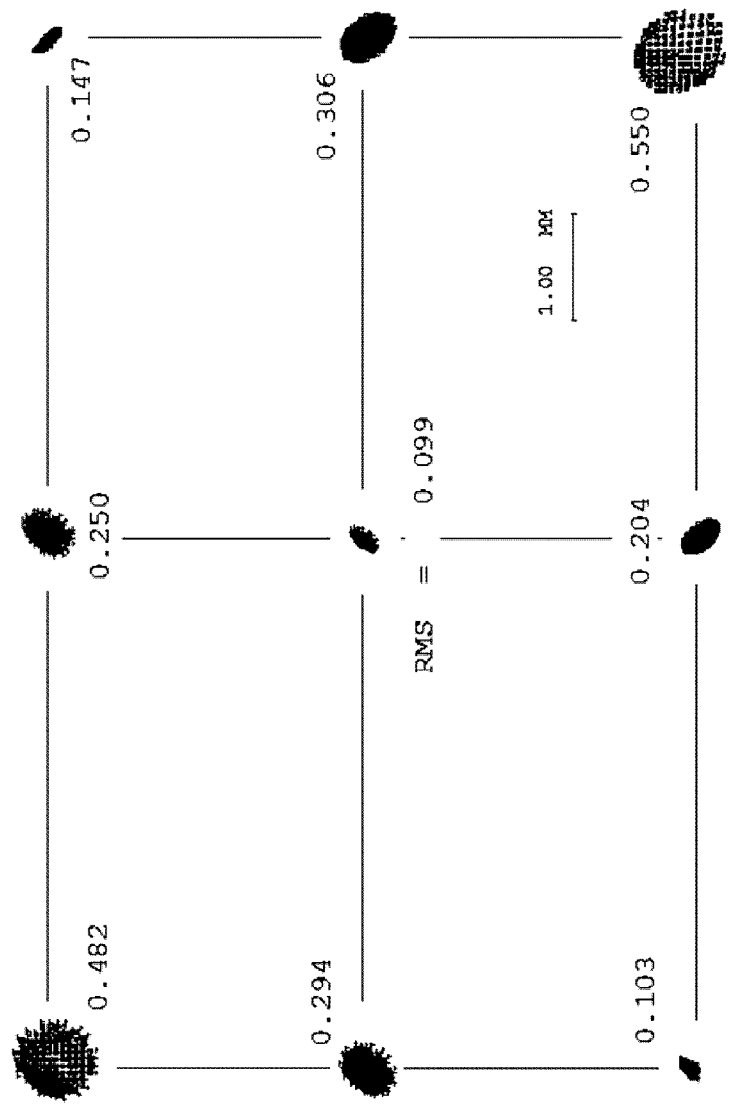
FIG. 7 is a simulated spot size diagram for the reference design.

FIG. 6 shows a simulated distortion grid for the reference design. Distortion values are 5.1% in the left-top and right-bottom corners and 1.1% in the right-top and left-bottom corners. FIG. 7 shows root mean square spot sizes (in mm), for the reference design, at nine points on the digital micro-mirror device plane, the nine points being the center, four corners and four side-centers. FIG. 7 includes a scale bar (on which "MM" identifies millimeters as the unit of measure) for the spots (their separations are not drawn to scale).

TABLE 2

| Surface | Y radius of curvature | Thickness | Glass code | Semi-dia | Decenter Data dY | X-tilt deg | Z-tilt deg | Type |
|---|---|---|---|---|---|---|---|---|
| 0 - Object | INF | 0 | | | | | | |
| 1 | INF | 2.728 | | 4.9 | | | 45 | Basic |
| 2 - L1 | −10.987 | 8.703 | 893.204 | 5.5 | | | | |
| 3 | −17.296 | 0.5 | | 9.1 | | | | |
| 4 - L2 | 1383.190 | 5.305 | 852.408 | 10.2 | | | | |
| 5 | −33.469 | 41.306 | | 10.9 | | | | |
| 6 - L3 | −90.052 | 3.444 | 847.238 | 13.2 | | | | |
| 7 - L4 | 38.489 | 9.5 | 743.493 | 13.9 | | | | |
| 8 | −46.528 | 0.5 | | 14.5 | | | | |
| 9 - L5 | 88.650 | 4.981 | 852.408 | 14.5 | | | | |
| 10 | −166.009 | 0.1 | | 14.2 | | | | |
| 11 - Stop | INF | 67.034 | | 13.97 | | | | |
| 12 - L6 | 59.018 | 4.899 | 852.408 | 15.9 | 0.120 | −0.937 | | Basic |
| 13 | INF | 1.0 | | 15.6 | | | | |
| 14 Prism-in | INF | 21.737 | 517.642 | 21 | −1.747 | | | Basic |
| 15 Prism-diagonal | INF (TIR reflect) | −18.622 | 517.642 | 26.5 | | 50.0 | | Decenter & Bend |
| 16 Prism-out | INF | −1.5 | | 23 | | −16.8 | | Basic |
| 17 Window | INF | −2.6 | 487.704 | 15 | 0.472 | | −45 | Basic |
| 18 | INF | −0.7 | | 15 | | | | |
| 19 - Image | INF | 0 | | | | | | |

The prescription of a system such as that of the embodiment of FIGS. 1-2B may be developed using analysis and design software, such as Code V (available from Synopsis, www.synopsys.com). Such software may be employed both to trace optical rays through an optical system (defined, for example, by a prescription such as those of Table 1 and Table 2), and to produce measures of performance, or "performance metrics", such as distortion grids and spot size diagrams, which may be used to assess the performance of a design, and to determine whether any given candidate design change results in a performance improvement. Such software may also be capable of using an optimization procedure to automatically adjust certain parameters of the design (e.g., lens positions (including transverse offsets, for decentered lenses), radii of curvature, and tilts) toward a local or global maximum or minimum in a performance metric. In some embodiments a weighted average of spot sizes and amounts of distortion at various positions on the digital micro-mirror device is used as a performance metric to be optimized.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Although limited embodiments of an illumination system for light projection have been specifically described and illustrated herein, many modifications and variations will be apparent to those skilled in the art. Accordingly, it is to be understood that an illumination system for light projection employed according to principles of this invention may be embodied other than as specifically described herein. The invention is also defined in the following claims, and equivalents thereof.

What is claimed is:

1. An optical system for receiving light from a source region of an output plane of a light source and producing spatially modulated light, the optical system having a chief ray and comprising:
   a first lens group, comprising a first plurality of lenses; and
   a second lens group, comprising one or more lenses,
   a first lens of the first lens group having:
      a rotationally symmetrical front surface;
      a rotationally symmetrical back surface;
      an effective focal length; and
      an optical axis defined by the rotationally symmetrical front surface and the rotationally symmetrical back surface,
   wherein the first lens group comprises a first lens subgroup and a second lens subgroup, wherein each lens of the plurality of lenses of the second lens subgroup having:
      a rotationally symmetrical front surface,
      a rotationally symmetrical back surface, and
      an optical axis defined by the rotationally symmetrical front surface and the rotationally symmetrical back surface, and wherein
   each of the optical axes of the second lens subgroup being tilted, with respect to the chief ray, by at least 2 degrees.

2. The optical system of claim 1, wherein
   the first lens subgroup comprising the first lens and a second lens, the first lens and the second lens being axially separated by less than 2 mm, and
   the second lens subgroup comprising a third lens and a fourth lens, the third lens and the fourth lens being axially separated by less than 2 mm.

3. The optical system of claim 2, wherein the first lens group has an effective focal length and the optical system comprises a gap, between the first lens group and the second lens group, of at least 1.4 times the effective focal length of the first lens group.

4. The optical system of claim 3, wherein, within the gap, rays originating from a midpoint of the source region:
   are parallel, or
   converge, with a convergence cone half-angle less than 10 degrees.

5. The optical system of claim 1, wherein the optical axes of the lenses of the second lens subgroup are aligned to each other to within 0.2 degrees.

6. The optical system of claim 5, wherein a midpoint, of the portion of the optical axis, between the front surface and the back surface, of a lens of the plurality of lenses of the second lens subgroup, is offset from the chief ray by at most 1 mm.

7. The optical system of claim 6, wherein each of the respective optical axes of the plurality of lenses of the second lens subgroup is tilted, with respect to the chief ray, by at least 2 degrees.

8. An optical system for receiving light from a source region of an output plane of a light source and producing spatially modulated light, the optical system having a chief ray and comprising:
   a first lens group, comprising a first plurality of lenses; and
   a second lens group, comprising one or more lenses,
   a first lens of the first lens group having:
      a rotationally symmetrical front surface;
      a rotationally symmetrical back surface;
      an effective focal length; and
      an optical axis defined by the rotationally symmetrical front surface and the rotationally symmetrical back surface; and
   a prism having:
      a first planar surface;
      a second planar surface; and
      a third planar surface,
      the prism being composed of a transparent material having a first index of refraction
      the chief ray entering the prism through the first planar surface, and striking the second planar surface from the interior of the prism at a first angle relative to an internal normal vector of the second planar surface, the first angle being greater than the inverse sine of the reciprocal of the first index of refraction.

9. The optical system of claim 8, further comprising a digital micro-mirror device at, and parallel to, the third planar surface of the prism, wherein the chief ray:
   reflects from the second planar surface,
   exits the prism through the third planar surface,
   reflects from the digital micro-mirror device,
   re-enters the prism through the third planar surface, and
   exits the prism through the second planar surface.

10. The optical system of claim 8, wherein the first lens group comprises:
   a first lens subgroup; and
   a second lens subgroup, the first lens subgroup comprising the first lens and a second lens, the first lens and the second lens being axially separated by less than 2 mm, and the second lens subgroup comprising a third lens and a fourth lens, the third lens and the fourth lens being axially separated by less than 2 mm.

11. The optical system of claim 10, wherein the first lens group has an effective focal length and the optical system comprises a gap, between the first lens group and the second lens group, of at least 1.4 times the effective focal length of the first lens group.

12. The optical system of claim 11, wherein, within the gap, rays originating from a midpoint of the source region:
- are parallel, or
- converge, with a convergence cone half-angle less than 10 degrees.

13. The optical system of claim 11, wherein each of the respective optical axes of the plurality of lenses of the second lens subgroup is tilted, with respect to the chief ray, by at least 2 degrees.

14. The optical system of claim 8, wherein the second lens subgroup comprises a plurality of lenses including the third lens and the fourth lens,
each lens of the plurality of lenses of the second lens subgroup having:
- a rotationally symmetrical front surface;
- a rotationally symmetrical back surface; and
- an optical axis defined by the rotationally symmetrical front surface and the rotationally symmetrical back surface, each of the optical axes of the second lens subgroup being tilted, with respect to the chief ray, by at least 2 degrees.

15. The optical system of claim 14, wherein the optical axes of the lenses of the second lens subgroup are aligned to each other to within 0.2 degrees.

16. The optical system of claim 15, wherein a midpoint, of the portion of the optical axis, between the front surface and the back surface, of a lens of the plurality of lenses of the second lens subgroup, is offset from the chief ray by at most 1 mm.

* * * * *